MEMORY APPARATUS

Original Filed July 18, 1962 5 Sheets-Sheet 1

WALTER G. HARRISON
LEO A. GARY
ALLAN C. AUDET
*INVENTORS*

BY
Ooms, McDougall & Hersh
ATTORNEYS

MEMORY APPARATUS

Original Filed July 18, 1962 5 Sheets-Sheet 2

INVENTORS
WALTER G. HARRISON
LEO A. GARY
ALLAN C. AUDET
BY
Ooms, McDougall & Hersh
ATTORNEYS

MEMORY APPARATUS

Original Filed July 18, 1962

WALTER G. HARRISON
LEO A. GARY
ALLAN C. AUDET
*INVENTORS*

BY
*Ooms, McDougall & Hersh*
ATTORNEYS

WALTER G. HARRISON
LEO A. GARY
ALLAN C. AUDET
*INVENTORS*

BY Ooms, McDougall & Hersh
ATTORNEYS

WALTER G. HARRISON
LEO A. GARY
ALLAN G. AUDET
INVENTORS

BY
Ooms, McDougall & Hersh
ATTORNEYS

United States Patent Office 3,272,354
Patented Sept. 13, 1966

3,272,354
MEMORY APPARATUS

Walter G. Harrison, Westchester, Leo A. Gary, Chicago, and Allan C. Audet, Arlington Heights, Ill., assignors to The Spra-Con Company, Chicago, Ill., a corporation of Illinois Continuation of application Ser. No. 210,699, July 18, 1962. This application June 3, 1965, Ser. No. 467,170
18 Claims. (Cl. 214—11)

This application is a continuation of applicants' copending application Serial No. 210,669, filed July 18, 1962, and entitled, "Memory Apparatus," now abandoned.

This invention relates to a memory apparatus of the type which is adapted to receive a code corresponding to certain identifying information, to retain this code for a certain period of time, and then to transfer the code to other systems in accordance with certain prearranged circumstances. In particular, the memory apparatus of this invention is adapted for use in combination with article transfer means whereby a code can be assigned to a given article, the code can be retained by the memory apparatus, and the code can then be passed along with the article as the transfer means transfers the article.

In applicants' copending application Serial No. 186,523, filed April 10, 1962, now Patent No. 3,187,878, and entitled, "Article Handling Apparatus," there are described means for use in combination with a system including a plurality of stations located for the receipt of articles which have been transferred onto a conveyor. In said copending application, conveyors of the type mentioned in additional copending applications Serial No. 81,754, filed January 10, 1961, now Patent No. 3,167,192, and entitled, "Automatic Sortation System," and Serial No. 139,140, filed September 19, 1961, now Patent No. 3,140,771, and entitled, "Delivery Apparatus," are referred to. Conveyors of this type are adapted to distribute articles at various locations in accordance with codes assigned to the articles and transferred to a memory device associated with the conveyor at the same time as the articles are placed on the conveyor.

In application Serial No. 186,523, an accumulator mechanism is described which is adapted to be employed in combination with such conveyor systems. The accumulator mechanism is adapted to hold one or more packages for an indefinite period and is adapted to pass these packages to a transfer apparatus in accordance with load conditions prevailing. In the accumulator described in this last mentioned application, a plurality of stations, formed of independently operated sets of belts, are provided. Articles are adapted to be passed from one belt set to another and eventually to a transfer apparatus whereby they can be directed to a desired location. If the transfer apparatus is, for some reason, not operating, the sets of belts are adapted to store articles until it is desired to resume operation of the transfer means. The accumulator is then adapted to automatically move the stored articles, one at a time, to a transfer position.

In accumulator mechanisms of this type, it is desirable to provide means for applying a code to articles as they are deposited on one end of the accumulator. These means must be capable of storing the codes of different articles as they are sequentially placed on the conveyor, and they must be capable of transferring the codes at the proper time and in the proper sequence. Furthermore, the coding device must be adapted to operate in a sporadic fashion in accordance with the corresponding variations in activity of the accumulator mechanism.

It is, accordingly, an object of this invention to provide a unique memory device which is adapted to be used in combination with article transfer means whereby a code can be assigned to a given article, the code can be retained by the memory device for an indefinite period, and the code can then be passed along with the article as the transfer means operates.

It is an additional object of this invention to provide a memory device for use in combination with an article accumulating transfer means, the memory device being capable of storing the codes for different articles as the articles are sequentially placed on the accumulator and also being capable of transferring the codes at the proper time and in the proper sequence as the articles are transferred from the accumulator.

These and other objects of this invention will appear hereinafter and, for purposes of illustration, but not of limitation, specific embodiments of this invention are shown in the accompanying drawings in which FIGURE 1 is a schematic illustration of an accumulator mechanism suitable for use in combination with the memory device of this invention;

The memory apparatus of this invention is designed for receiving a plurality of codes which have been assigned to a corresponding number of articles. The apparatus is also designed for transferring the codes to a delivery means whereby the articles can be eventually deposited at locations corresponding to the codes. The memory apparatus comprises a plurality of relatively movable code receiving means and includes a first station designed to transfer codes to the receiving means. Means are provided for moving the receiving means after they have been coded to a second station and means are provided at the second station for reading the codes. After the codes have been read, they are transferred to the delivery apparatus for eventual disposition of the articles at desired locations. The apparatus of this invention is so designed that its operation can be integrated with the operation of an accumulator mechanism whereby the codes can be assigned to the articles and receiving means coded as soon as the articles are placed on the accumulator. Furthermore, the synchronization results in reading of the codes and transfer of the codes to the delivery means at the same time as the accumulator mechanism transfers the corresponding articles. The apparatus functions in this synchronized fashion irrespective of the delay between coding and reading, and in spite of sporadic operation of the accumulator.

In one form of this invention, the code receiving means include a plurality of pins which can be moved to a protruding position in response to the action of solenoids or similar electro-responsive means. The reading means associated with this form of the invention includes a plurality of contacts which are engaged by the protruding pins at the reading station. This engagement completes a circuit corresponding to the particular code represented by the pins which are protruding. By reason of the completion of this circuit, the exact code is transferred to the delivery means when the article is transferred by the accumulator.

In an alternative form of this invention, the code receiving means may comprise isolated magnetic portions and the means for transferring the code to the receiving means will then be adapted to magnetize certain portions in accordance with the particular code to be transferred. The code reading means will then comprise magnetically sensitive heads which will, in turn, transfer the proper code as the article from the accumulator is transferred to the delivery means.

Figure 1:
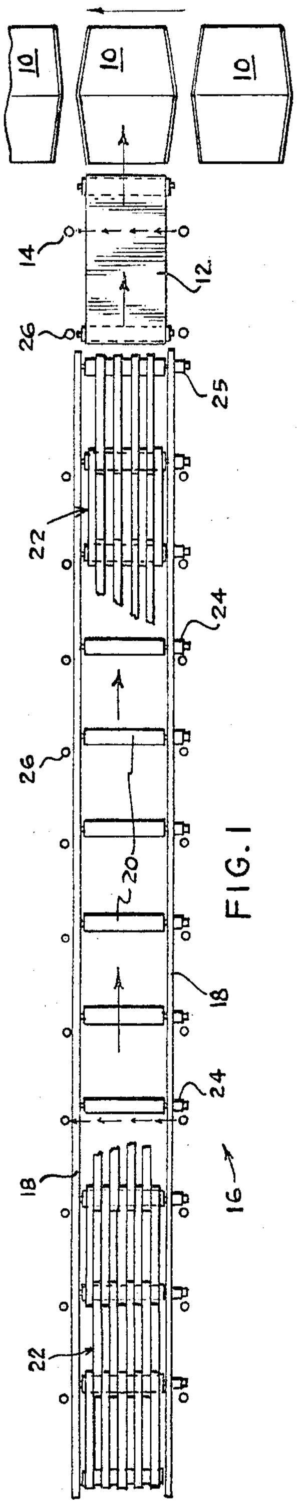

FIGURE 1 of the accompanying drawings illustrates a conveyor system including the trays 10 which operate in the manner set forth in the aforementioned application Serial No. 81,754. Specifically, the trays 10 are adapted to deliver articles carried thereon to any one of several stations along the conveyor path. In accordance with the prior disclosure, a memory system permits assigning of a code upon placement of an article on one of the trays, and the system provides for automatic delivery of the particular articles at a station corresponding to the assigned code.

A transfer belt 12 may be provided for transferring articles onto conveyor trays 10. This belt may, for example, comprise a two-speed belt of the type described in the aforementioned copending application Serial No. 139,140. A belt of this type is adapted to carry an article at low speed until the article moves into the path of an electric eye 14. At this time, the belt stops and remains stationary until an empty tray 10 is in position to receive the article on the belt. A high speed drive means for the belt 12 is then adapted to be operated, and the article will be passed to the empty tray. A system of the type described in application Serial No. 139,140 is provided with means whereby the code can be assigned to the article upon entry onto the belt 12, and the code is adapted to be transferred to the conveyor memory unit when the article is passed to the conveyor. A system of this type will be hereinafter described with reference to the memory apparatus of this invention.

Positioned adjacent the transfer belt, there is provided an article accumulator generally designated by the numeral 16. The accumulator includes elongated frame members 18 and rollers 20 mounted between the frame members. A plurality of belt sets 22 are mounted to pass around adjacent rollers with the belts of adjacent sets in intermeshing relationship. Thus, the upper reach of one belt set is in overlapping relationship with respect to the upper reach of an adjacent set.

A motor 24 is provided for driving each belt set. As described in the aforementioned application Serial No. 186,523, the belts in a given set are driven through a drive roller portion of each roller shaft, while the overlapping ends of the belts in an adjacent set are provided over an idler portion of the rollers. Accordingly, operation of one of the motors 24 will cause movement of the upper reach of one belt set from left to right in the drawing, while the adjacent set will remain stationary unless its motor 24 is put into operation.

Electric eyes or similar devices 26 which include means for projecting a beam over the upper surface of the conveyor, and means on the opposite side for detecting the beam, are provided for each belt set. These detecting devices 26 are each operatively connected to one motor 24. The motor connected to the detecting means is adapted to be stopped when the beam projected is interrupted by an article on the conveyor. The motors are adapted to run continuously as long as the beam remains uninterrupted.

As explained in Serial No. 186,523, packages are placed at the loading end of the accumulator to be eventually transferred to the conveyor trays 10. If the accumulator is empty, each of the motors 24 will be operating and a package placed on the left-hand belt set will proceed immediately to the transfer belt 12. This package will then be placed on the conveyor 10 when an empty tray is in the proper position. If a package is already on the transfer belt 12, this belt will be stationary and a second package will not be able to pass onto the belt 12 and will, therefore, be stopped across the beam of the right-hand detecting means 26. Accordingly, the right-hand motor 25 will stop. A third package placed on the accumulator will then stop across the beam of the next detecting means, stopping the next motor. As long as these three packages remain in position, additional packages placed on the accumulator will line up adjacent succeeding detecting means until each of the belt sets is topped and the accumulator is full.

FIGURES 2 through 12 illustrate the details of a memory unit which is particularly suitable for use in combination with an accumulator mechanism of the type illustrated. The memory unit is adapted to receive and store a code for each of the packages which are placed on the accumulator and is then adapted to transfer the code when the packages are transferred from the accumulator. The device illustrated consists of a base portion 28 having supporting blocks 30 which space the ring 32 with respect to the base 28. The ring 32 has an L-shaped cross section and, in combintaion with the upper ring 34, forms an annular track 36.

An opening is located centrally of the base, and a drive shaft 38 extends through this opening. Secured to the shaft 38 by means of a set screw 40 is an externally threaded hollow shaft 42. A ring 44 is tightly clamped around the shaft 42 by means of a screw 46. This ring is rigidly held on the shaft 42 and a compression spring 48 is located around the shaft between this ring and a pile of washers and leaf members.

The washers comprise a friction washer 50 and a drive washer 52. The friction washer 50 is formed of leather or some other material adapted to frictionally engage surfaces adjacent thereto and to thereby transmit a driving force. If the structure defining this surface adjacent thereto is impeded by some stop means, the washer 50 is adapted to slip with respect to this surface.

The driven washer 52 is provided with a chordal portion 54 (FIGURE 11) which is adapted to engage the flat side 56 of the hollow shaft 42. When the washers 52 are fitted over tht shaft 42, they are, therefore, locked in driving engagement with this shaft.

The washers 50 and 52 are located adjacent each other on the shaft 42 so that the washer 52 transmits rotary movement to the washer 50. The compression spring 48 acts to press these washers together to provide the desired frictional engagement.

Engaging the opposite face of each friction washer 50 is a leaf member 58 which includes a pair of oppositely extending arms 60. The leaf members are also adapted to be rotated through engagement with the washers 50 and the compression spring 48 again provides the desired frictional contact.

Figures 2, 3:
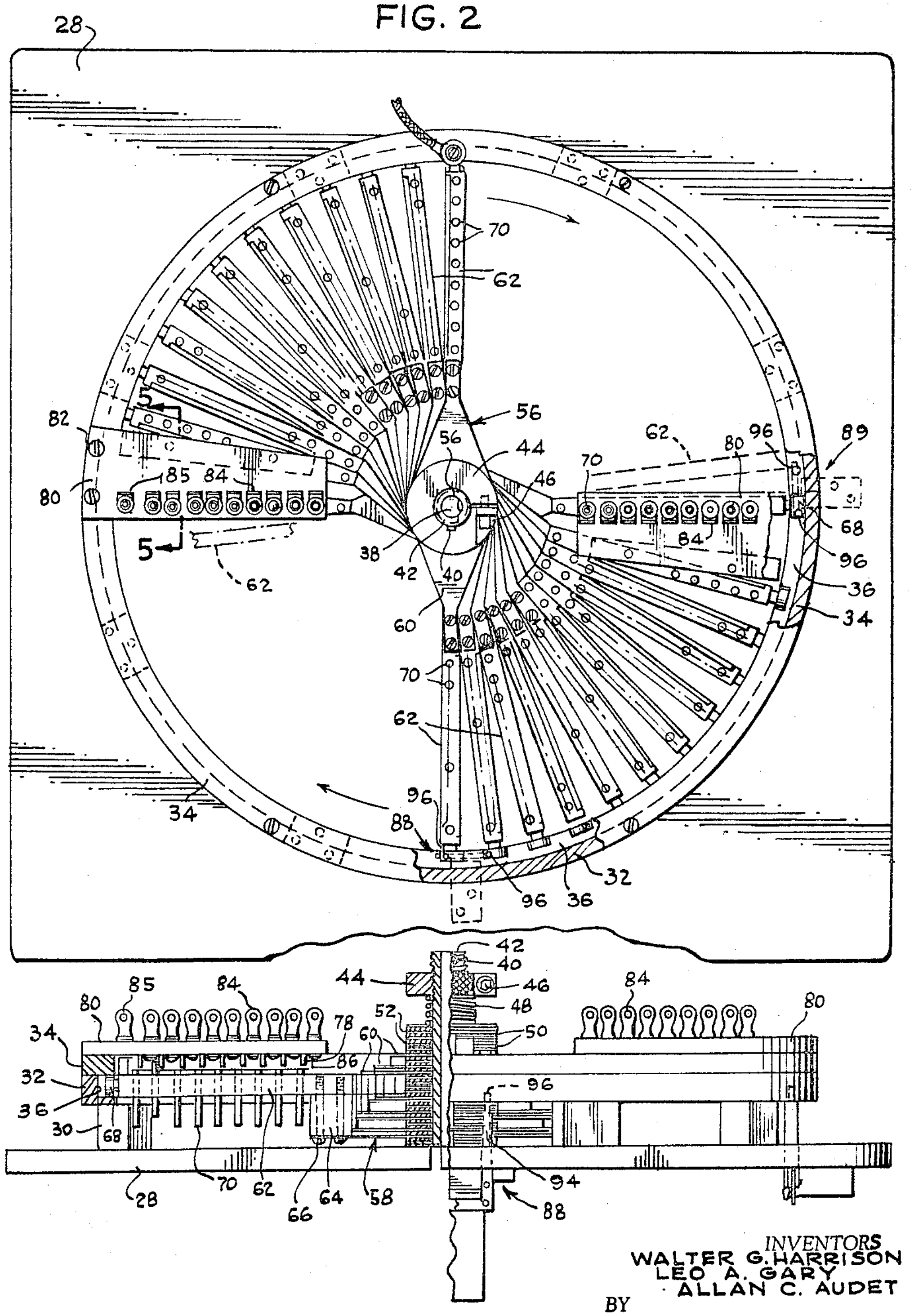
FIGURE 2 is a plan view, partially cut away, of one form of a memory apparatus.
FIGURE 3 is a side elevation, partly in section, of the memory apparatus shown in FIGURE 2.
Figure 5:
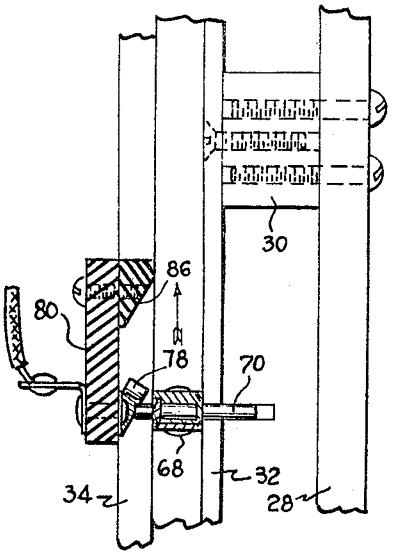
FIGURE 5 is an enlarged fragmentary sectional view, taken about the line 5—5 of FIGURE 2.

A plurality of bars 62 are connected to the ends of the arms 60. These bars are all to be located in the same plane and, accordingly, spacers 64 are provided between the bars and the arms. As illustrated, the arms 60 are located in different planes depending on their position with respect to the shaft 42. Spacers 64, which are connected to the arms by means of screws 66, are of different sizes to provide fastening of the bars in the same plane. As shown in FIGURE 3, one pair of oppositely directed bars can be directly connected to the arms 60, eliminating the need for a spacer, since the ends of the arms and the bars are in the same plane.

The bars 62 are each provided with small wheels 68 rotatably mounted in their ends. These wheels ride in the annular track 36 formed by the rings 32 and 34. The wheels 68 serve to maintain the bars each in the same plane and also function to cooperate with stop means in a manner to be described.

A plurality of pins 70 are fitted along the lengths of each of the bars 62. The pins are frictionally held in position by the bars so that movement in and out with respect to the bars must be accomplished by some outside influence. To accomplish outward movement, solenoid structures 72 are located beneath the plane of movement of the bars and along a diameter of the apparatus. A number of setting pins 74 corresponding to the number of pins 70 extend through the base 28 and the ends of these setting pins are adapted to engage the inner ends of the pins 70. The setting pins are adapted to be pushed outwardly in response to outward movement of plungers 76 associated with the solenoid structures. The setting pins engage the pins 70 and force them to an outward position as shown by the single pins in FIGURES 3 and 4. Although the setting pins retract, the pins 70 remain in position due to frictional engagement with the bars 62.

The outwardly extending pins are adapted to engage contacts 78 which are secured to plates 80 fastened on opposite sides of the ring 34 by means of screws 82. The contacts 78 include terminals 84 located on top of the plates 80. The contacts also comprise small metal strips which extend outwardly from the plates and at an angle so that the faces of the strips engage the sides of outwardly extending pins 70, this engagement being best shown in FIGURES 3 and 5.

A terminal 85 is located on one plate 80 to provide ground through the bars 62, pins 70, contacts 78 and terminals 84. The arms 60 and screws 66 are also conductive to complete a circuit between the terminals 84 on the opposite plate 80 and the ground terminal 85.

Pin restoring cams 86 are also fastened to the plates 80 at points beyond the contacts 78. The cam surfaces of these two members are adapted to engage the protruding ends of pins 70 and are adapted to force the pins back to their normal position as the bars 62 pass the cams.

Figure 7:
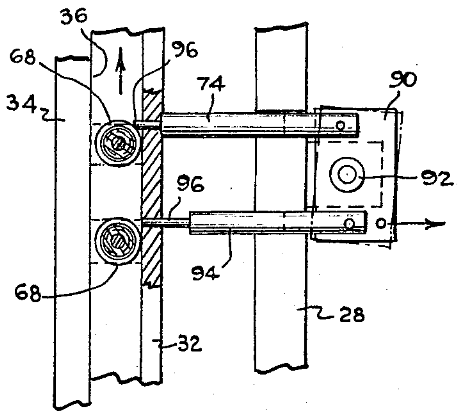
FIGURE 7 is an enlarged fragmentary view of the guide track and associated rollers also illustrating roller retaining and releasing means.
Figures 8, 9, 10, 11, 12:
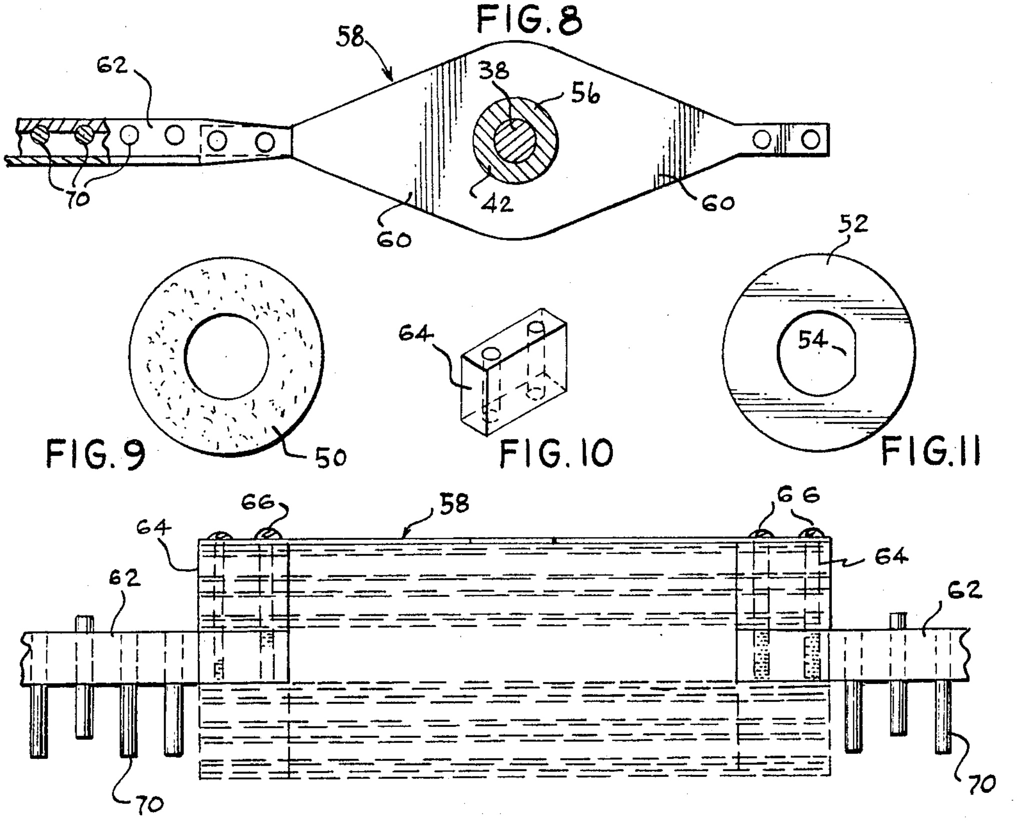
FIGURE 8 is an enlarged fragmentary view, partly cut away, illustrating portions of the rotatable leaf members and arms adapted to receive and transfer codes.
FIGURE 9 is an enlarged detail view of a friction washer for use in combination with the rotatable means.
FIGURE 10 is an enlarged detail perspective view of a spacer element for use in combination with the leaf members and arms.
FIGURE 11 is an enlarged detail view of a drive washer for use in combination with the rotatable members.
FIGURE 12 is an enlarged fragmentary view of portions of the rotatable members and associated spacers and coding pins.

Located in the annular track 36 are two retaining means generally referred to as 88 and 89 in FIGURE 2 and shown in detail in FIGURE 7. These retaining means include a plate 90 pivotally mounted on a shaft 92. A pair of pins 94 are pivotally connected to the plate and these terminate in reduced diameter ends 96 which extend through holes in the ring 32. The pins 94 also extend freely through openings in the base 28 so that pivoting of the plate 90 results in movement of one of the ends 96 into the path of a wheel 68 moving in the track 36. The wheels 68 are of a diameter substantially equal to the height of the track 36 so that the protrusion of an end 96 prevents passage of a wheel 68 and, accordingly, stops rotary movement of the assoicated arm 62. FIGURE 7 illustrates the right-hand end 96 in the stop position. If the plate 90 is pivoted, this end 96 releases the forward wheel 68, while the other end 96 moves up to prevent release of the next wheel. When the plate 90 is again moved, the left-hand end 96 releases the next wheel, but the other end will then again be in the stop position.

The thickness of the bars 62 prevents more than one wheel in the track being released at one time. Thus, only one wheel 68 can be located between the ends 96 at any given moment.

The plate 90 is preferably pivoted by means of a solenoid. Thus, in response to an electrical signal, the associated pin ends 96 will operate to release the wheels 68 and associated bars 62. It must be appreciated that the drive shaft 38 and shaft 42 secured thereto are constantly rotating during operation of the device. Accordingly, through the action of drive washers 52, friction washers 50 and leaf members 58, the bars 62 will rotate unless the assoicated wheels 68 are stopped by a pin end 96.

Figure 15:
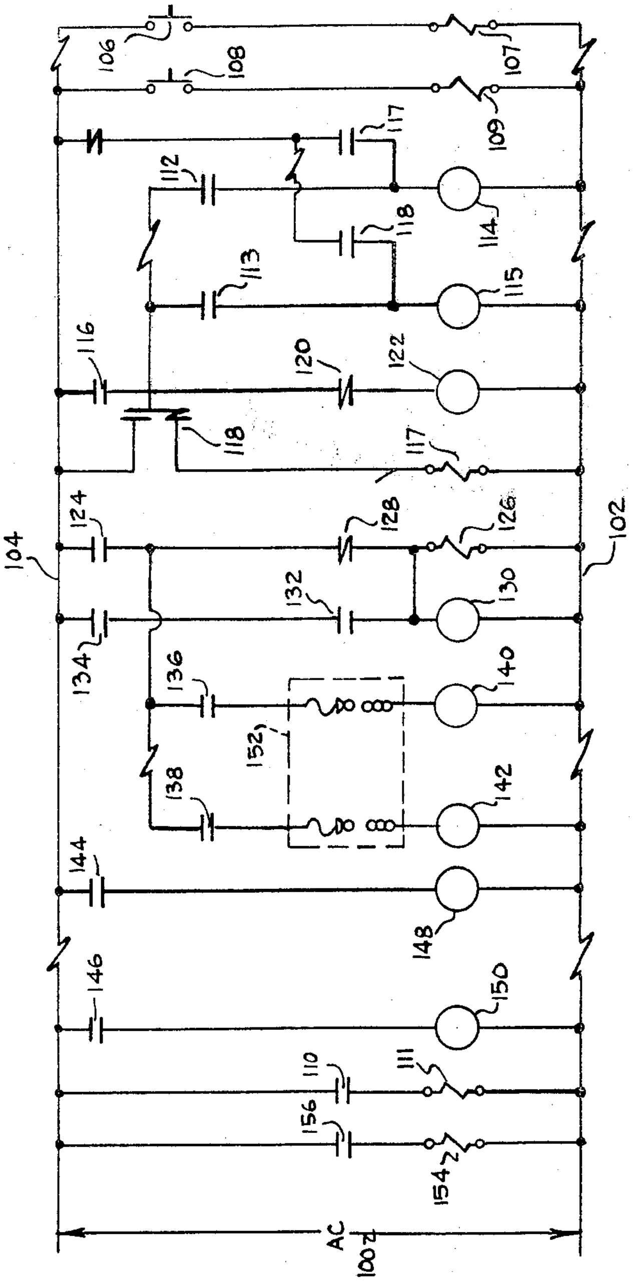
FIGURE 15 is a diagrammatic illustration of one example of a circuit which can be employed in combination with the memory apparatus.

The operation of the described device will be illustarted in combination with the accumulating mechanism shown in FIGURE 1 and with respect to the circuit diagram shown in FIGURE 15. It will be appreciated, however, that the mechanism of this invention will have uses in systems having differing characteristics.

The device of this invention is adapted to be utilized for coding packages as they are placed on the entry end of the accumulator 16. In the illustrated mechanism 12 pairs of oppositely directed bars 62 are provided. The number of these pairs corresponds to the number of belt sets 22 on the accumulator. Each bar 62 is provided with nine pins 70 which are adapted to be positioned by a corresponding number of setting pins 74 operated by the solenoid 72. The total of eighteen pins corresponds to the digits 1 through 9 and 10 through 90, permitting ninety-nine different coding combinations. It will be appreciated that any combination of digits could be employed in a mechanism including the characteristics of this invention.

Figure 4:
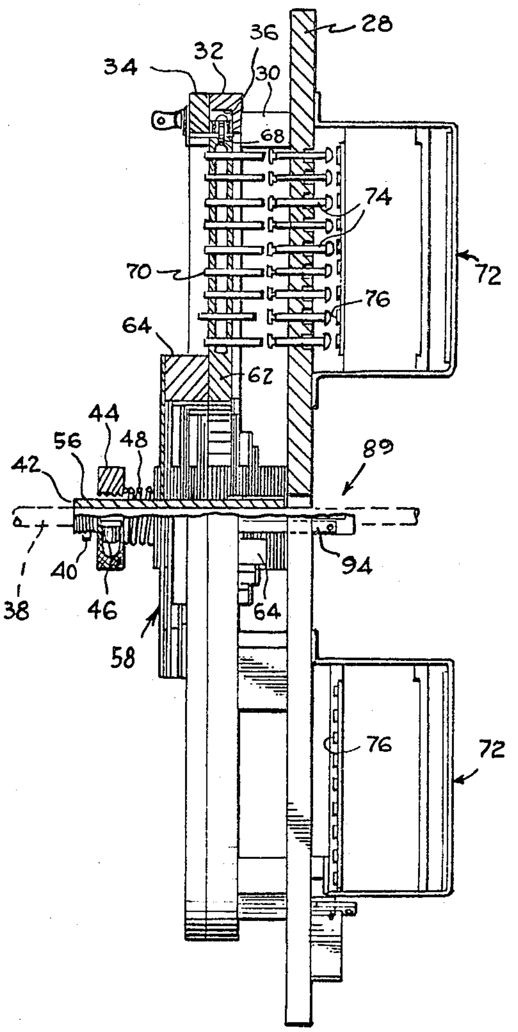
FIGURE 4 is a side elevation, partly in section, of the memory apparatus of FIGURE 2, and also illustrates coding means therefor.
Figure 6:
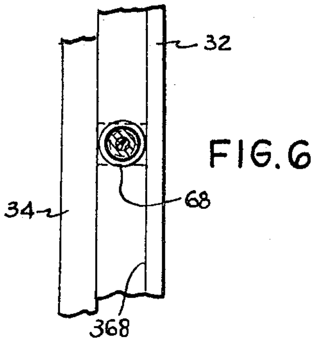
FIGURE 6 is an enlarged fragmentary view of the guide track of the memory apparatus, and of a roller associated therewith.

The coding combinations correspond to different stations located along the path of trays 10. To direct an article to a particular station, for example, a station designated No. 92, the operator pushes buttons assigned to No. 92 as he places the article on the accumulator. This energizes the solenoid structures 72 to move the No. 9 plunger 76 associated with one structure and the No. 2 plunger 76 on the other side assoicated with the other solenoid structure. The corresponding pins on the bars 62 will thus move outwardly in response to the action of the setting pins 74. The pins on the bars 62 will be retained in the outward position, as shown in FIGURES 3 and 4.

Each bar is located above the solenoid structures 72 when it is to be coded. In FIGURE 2, the pair of bars in the coding position are positioned vertically, and the retaining means 88 holds these bars in a stationary position.

Referring to FIGURE 15, there is shown an A.C. source 100 connected by means of conductors 102 and 104 to the actuating relays, solenoids and switches which comprise an exemplary circuit. The circuit includes push button switches 106 and 108 which, for purposes of this example, correspond to the push buttons assigned to the code No. 92. Closing of these switches energizes solenoids 107 and 109, respectively, which are adapted to operate corresponding plungers 76 of the solenoid mechanisms 72. This results in movement of the setting pins 74 as well as movement of the pins 70 on the bars 62 whereby the No. 9 pin on one bar and the No. 2 pin on the opposite bar are moved outwardly to a protruding position.

Energization of the solenoids 107 and 109, or any of the solenoids associated with the coding push buttons, also results in closing of switch 110 thereby energizing solenoid 111 which is connected to retaining means shown at 88 in FIGURE 2. A slight time delay may be associated with this operation to insure setting of the pins 70 before release of the bars 62 by the retaining means at 88.

When the bars are released, they are adapted to pass underneath the plates 80 and are held by the forward pin of the retaining means 89 located at this position. If a coded bar is already located beneath the plate 80, the next bar will move to the dotted line position shown in FIGURE 2, and is held in this position until the previous bar moves from beneath the plates 80. The thickness of the bars 62 retains the wheels 68 of the succeeding bars rearwardly of the other pin associated with the retaining means 89.

When in position under the plates 80, the protruding pins 70 engage the contacts 78. These contacts are represented by switches 112 and 113 in FIGURE 15, and completion of these switches energizes the relays 114 and 115, respectively (switch 116 is closed during low speed operation of the belt 12, as will appear). Relays 114 and 115 complete their own hold circuits by closing switches 119 and 118, respectively. It will be appreciated that a switch, such as the switches 112 and 113, and an associated relay is provided for each of the pins 70 so that any coding combination will be covered by the circuitry.

With the switch 116 closed, the low speed solenoid 117 (associated with the drive mechanism for the belt 12) will be energized, since a circuit is completed through the normally closed side of switch 118. Assuming that no other articles are present on the belt 12 and on the accumulator, the article with the assigned code No. 92 will be passed to the belt 12 moving at low speed. The bars 62 having the protruding pins will move under the plates 80 prior to the time the package reaches the belt and, therefore, the switches 112 and 113 are completed when the package reaches the belt 12.

The package on the belt 12 is carried to the path of beam 14 (FIGURE 1), interrupting this beam, which results in opening of photo-switch 120 and de-energizing of relay 122. Relay 122 is adapted to hold in switch 116 and, therefore, this switch opens when the relay is de-energized. This stops low speed movement of the belt 12.

The coded article will wait on the belt 12 until an empty tray 10 moves into position for receiving an article. When the tray is in position, it is adapted to mechanically close switch 124, thereby energizing high speed belt solenoid 126. A switch 128 in this line is closed whenever the low speed solenoid 117 is de-energized. This solenoid 117 operates to open switch 128 when energized so that high speed movement of the belt 12 will not occur unless the belt is first stopped.

When the switch 124 is closed, relay 130 is also energized. This relay completes its own holding circuit by closing switch 132. The relay 130 also reversed the contacts on switch 118 so that relay 122 is again energized (switch 120 closes as soon as the package is moved from the path of light beam 14). This results in closing of switch 116 and resumption of low speed movement of the belt. As the conveyor continues, it operates to open normally closed switch 134 thereby de-energizing relay 130 and reversing switch 118. The belt now moves at low speed until the next package interrupts the beam 14.

It is, of course, necessary to transfer the code of the package as the high speed operation of the belt 12 passes the package to the conveyor. In this connection, it will be noted that the relays 114 and 115, corresponding to the code No. 92, are energized when the protruding pins complete switches 112 and 113. These relays, in addition to completing their own holding circuits, operate to close switches 136 and 138 when they are energized. When the conveyor closes mechanical switch 124, the relays 140 and 142 will, therefore, be energized. These latter relays, in turn, close switches 144 and 146, which results in energization of memory timer trip coils 148 and 150. As in the case of applicants' companion, copending applications entitled "Article Transfer Apparatus" and "Article Delivery Means," the energization of the memory timer coil is equivalent to the actuation of push buttons on a coding console of the type described in application Serial No. 81,754. Thus, the tray 10 on which the article destined for station No. 92 is carried is adapted to automatically deposit the article at this station.

It will be appreciated that the described mechanism operates to transfer the codes with the packages through automatic operation of the memory timer trip coils. One of these coils, as well as the relays 140 and 142, is provided for each possible digit in the codes to provide for complete coverage of all coding possibilities. Only two such relays are illustrated for purposes of simplicity.

In the circuit, a translator 152 is preferably provided to enable shifting of codes with respect to the dump stations along the route of the conveyor trays 10. Furthermore, devices of this nature permit assigning of more than one code to a particular dump station thereby increasing the versatility of the apparatus.

After the code for one package is transferred, it is necessary to move the coding bars 62 for this package to provide for entry of the next pair of bars beneath the plates 80. This is accomplished by energizing the solenoid 154 for the retaining means 89 so that the forward pin end 96 will move downwardly releasing the wheel 68 for the engaged bar. The other pin end 96 is moved up to prevent the succeeding bar from moving at this time.

The solenoid 154 is operated when the switch 156 is closed responsive to energization of the relay 130. Therefore, the bars are released at the same time as the code which they carried is transferred to the memory unit for the delivery apparatus. When the relay 130 is de-energized, the solenoid 154 will operate to raise the forward pin end 96 and lower the other end, enabling movement of a succeeding pair of bars into position under the plate 80.

The character of the memory device of this invention permits reliable operation irrespective of the operating condition of the accumulator and associated transfer belt and conveyor. If the conveyor is not operating, the first package deposited on the accumulator will come to rest across the beam 14, and the coding bars for this package will remain under the plates 80 for any desired length of time. Similarly, if the transfer belt is stopped, the first package will stop at the end of the accumulator while the coding bars therefor are at rest under the plates 80. In either case, the code will be transferred only when the high speed belt operation transfers the package. Furthermore, any succeeding packages placed on the accumulator 16 will build up behind the first package if it is stopped. The coding bars for these succeeding packages will also build up behind the first pair of bars.

Figure 13:
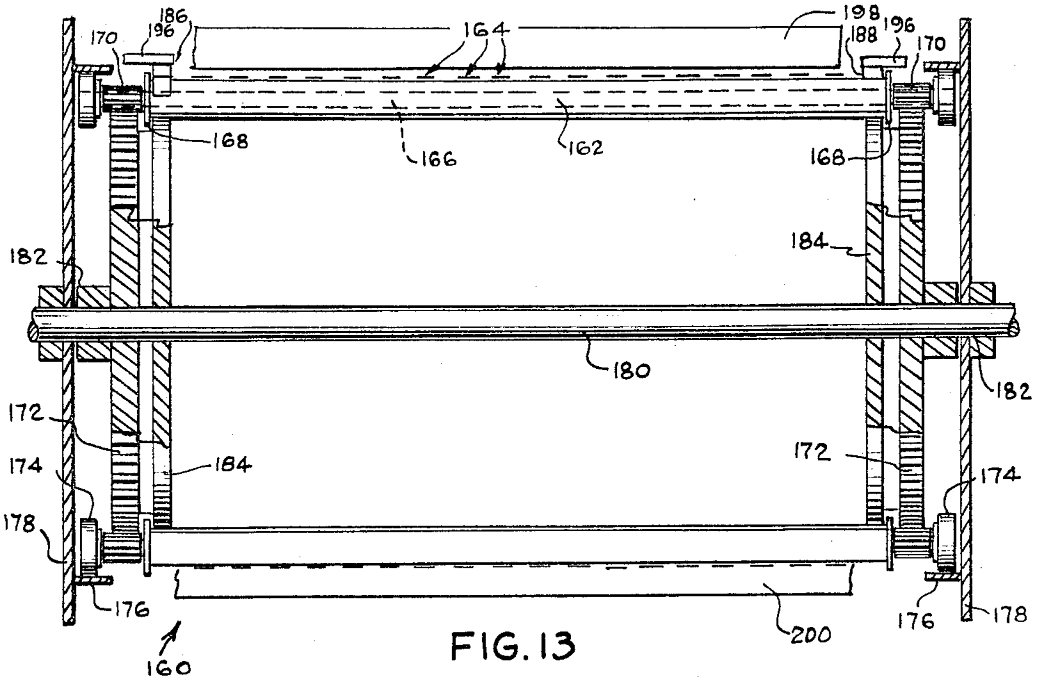
FIGURE 13 is an elevational view, in section, illustrating an alternative form of a memory apparatus characterized by the features of this invention.
Figure 14:
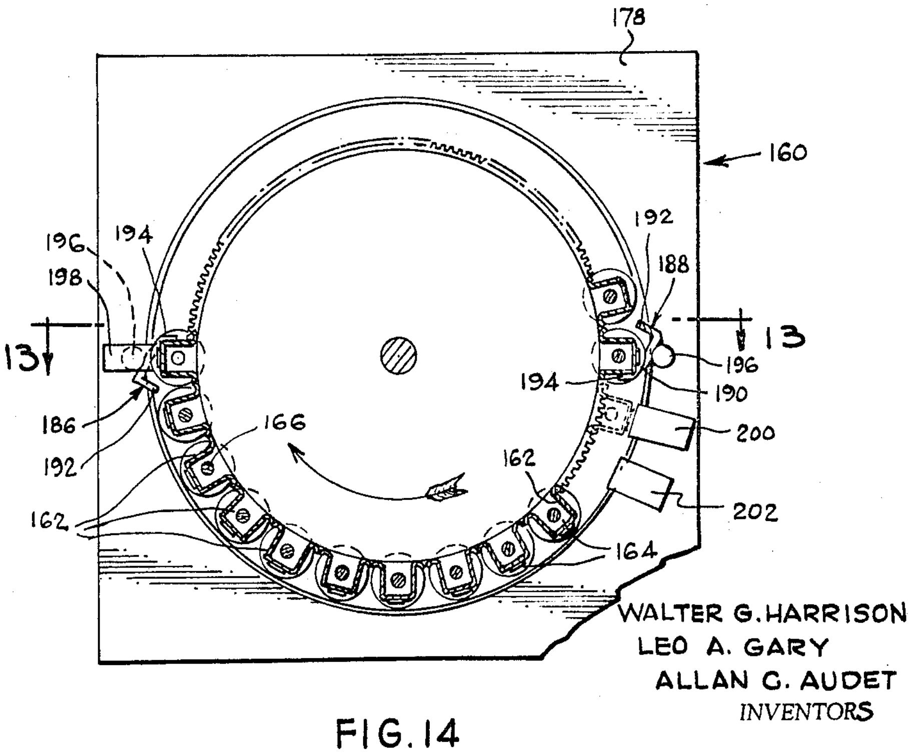
FIGURE 14 is an end view of the apparatus shown in FIGURE 13.

FIGURES 13 and 14 illustrate an alternative design for a memory device characterized by the features of this invention. It will be understood that the device shown in these figures can be integrated with an accumulator and conveyor structure of the type above referred to. Furthermore, as is the case with respect to the memory unit already described, the unit shown in these figures can be utilized in other systems.

The unit 160 illustrated comprises twelve U-shaped coding bars 162. The number of these bars corresponds to the number of belt sets on an accumulator, and each bar illustrated is provided with eighteen magnetizable regions 164, each region corresponding to a 10's or units digit to provide ninety-nine coding combinations. It will be understod that magnetic tape or any equivalent means may comprise the regions 164, and it will also be understood that any means sensitive to said conditions and adapted to retain and transfer a code can also be employed. Furthermore, it is contemplated that the structure shown in FIGURES 13 and 14 could employ movable pins, actuated by solenoids, of the type described with reference to FIGURES 2 through 12.

Each of the bars 162 is provided with a central rod 166 which is centered in plates 168 fastened at either end of the bars. The rod 166 is adapted to rotate with respect to the plates 168. Pinions 170 are fixed to the ends of each rod. These pinions mesh with gears 172 located on either side of the construction. Wheels 174, which are also fixed to the rod ends, ride within an annular rim 176 formed in the supporting walls 178. This arrangement maintains the pinions 170 on the periphery of the gears 172.

The gears 172 are operatively connected to a drive shaft 180 which is journalled at 182 in each supporting wall 178. Guide wheels 184 are also connected near each end of the shaft 180, and the edges of the U-shaped bars 162 ride on the rims of these wheels. The edges of the bars are preferably overturned to provide for smooth riding contact with the wheels 184.

Retaining means 186 and 188 are located at diametrically opposite points of the construction. These retaining means comprise a base portion 190 and a pair of flanges 192 and 194 depending therefrom. A shaft 196 is welded to the outer face of the base and is adapted to be rotated in a reciprocal fashion to bring one or the other of the flanges of each retaining means into the path of one of the bars 162.

Recording, reading and erasing heads of the type normally employed in combination with magnetic tape are utilized in the illustrated apparatus. The recording head 198 is located in line with the retaining means 186, while the reading head 200 and erasing head 202 are located at points beyond the retaining means 188. A code corresponding to a desired location for a given package is magnetically provided on one of the bars 162, while it is retained by the means 186. The means 186 is then adapted to release a coded bar and this bar will move to the retaining means 188. When the retaining means 188 releases this bar, the reading head 200 will pick up the code and the erasing head 202 will then remove the code so that the bar may be utilized in a succeeding cycle.

The drive shaft 180 is adapted to operate continuously. Therefore, when the bars 162 are not engaged by a retaining means, or are not backed up behind an engaged bar, the gears 172 will operate through pinions 170 to rotate the bars 162 in the direction of the arrow 204. Friction type clutches (not shown) can be included between the pinions and the ends of the code bars to provide for driving of the code bars in this manner. With this arrangement, when the bars 162 are impeded, the pinions thereof are adapted to rotate about their own axes without any resulting displacement of the bars. This is possible since the rods 166, upon which the pinions are fixed, are freely rotatable within the end plates 168 of the bars.

The operator of the mechanism can provide for application of a code to a bar 162 as he places a package on the accumulator 16. This coding action can also provide for actuation of a solenoid or other means to operate retaining means 186 thereby releasing the coded bar 162. When the leading flange of the retaining means moves up, the rearward flange moves down, preventing displacement of a succeeding bar underneath the recording means until the retaining means returns to its original position. The switches for actuating the coding means are preferably pushbutton switches, so that the circuit for operating retaining means 186 is operated only momentarily.

Through the operation of gears 172, coded bars are moved to the retaining means 188. This retaining means is adapted to release a coded bar as soon as the high speed operation of the belt 12, or some equivalent transfer operation, takes place. The bar 162, which has a code corresponding to a desired location for a package being transferred to a delivery means, is then read by the head 200. The code is then erased by the head 202.

With reference to FIGURE 15, it is contemplated that a relay, such as the relay 130, will initiate operation of the retaining means 188 when this relay is energized at the start of high speed belt operation. Also referring to FIGURE 15, the reading of the code by the head 200 can be adapted to initiate operation of relays such as the relays

140 and 142 whereby the memory timer coils for the conveyor trays 10 will be energized.

As in the use of the alternative memory apparatus design, previously described, the apparatus shown in FIGURES 13 and 14 is adapted to store codes indefinitely for articles which are placed on the accumulator and which may stay there for extended periods while the transfer belt or conveyor is not in operation. The coding bars 162 will build up in the device behind the retaining means 188 in the same order as the articles build up on succeeding belt sets on the accumulator. Similarly, the retaining means 188 will sequentially release the bars for reading as each article is transferred to the conveyor trays, irrespective of the time lag between each transfer. It will be apparent that at least one code bar must be provided for each stage on the accumulator. Preferably, additional code bars are included whereby additional stages can be added to the accumulator.

The two specific devices described are believed to illustrate the unique type of memory unit contemplated by this invention. Further, although the use of these units in combination with an accumulator and conveyor means represents an important phase of this invention, other applications for the devices will be apparent. In this connection, it is contemplated that articles could be transferred directly to a conveyor, or that transfer means other than the belt 12, for example, as described in the aforementioned copending applications, could be employed.

In considering alternative constructions for the memory devices of this invention, it will be appreciated that various other means for carrying coding mechanisms, and various other methods for coding these mechanisms and transferring the codes are possible. For example, the structure of FIGURES 13 and 14 need not be circular, and this would permit an increase in the number of coding bars. Similarly, various conveyor devices could be designed for carrying the bars and for retaining and releasing them in accordance with the coding and reading operations described.

It will be understood that various modifications can be made in the above described systems which provide the characteristics of this invention without departing from the spirit thereof, particularly as defined in the following claims.

That which is claimed is:

1. In an apparatus for receiving a plurality of codes and for generating a plurality of individual electrical signals corresponding to said codes, said apparatus comprising a plurality of relatively movable code receiving means with each of said receiving means carrying a plurality of members adapted to selectively retain said codes, a first station and actuating means located at said station for transferring said codes to said members, means for moving coded receiving means to a second station, means at said second station for holding said receiving means and for reading said codes, said reading means comprising a plurality of individual elements adapted to initiate operation of electrical circuits for generating said signals, said elements being located in a position corresponding to the positions of said members carried by said receiving means whereby said elements generate said signals depending upon which of said receiving means has been actuated to carry a code, and means for releasing said receiving means at said second station to effect reading of said codes, said holding means being adapted to hold a plurality of said receiving means and operating to release said receiving means one at a time for reading of said codes.

2. An apparatus in accordance with claim 1 wherein said receiving means include a plurality of reciprocal pin members, and said transferring means comprise electroresponsive means adapted to engage said pin members for reciprocating said members to move them to a protruding position, a plurality of contacts located at said second station, said reading means operating responsive to engagement of said contacts by said protruding pins.

3. An apparatus in accordance with claim 1 wherein said receiving means include a plurality of magnetizable areas, and including means at said first station for magnetizing certain ones of said areas in accordance with the codes to be transferred, said reading means comprising a magnetically sensitive means located at said second station.

4. An apparatus for receiving a plurality of codes assigned to a corresponding number of articles comprising a plurality of relatively movable code receiving means, a first station and means located at said station for transferring said codes to said receiving means, means at said first station for retaining said movable members until they are coded and adapted to release said movable members after they are coded, means for moving coded receiving means to a second station, means at said second station for reading said codes, and second reading means at said second station adapted to retain a plurality of coded movable members and to release said movable members one at a time.

5. An apparatus for receiving a plurality of codes comprising a plurality of elongated bars rotatable about a central axis, a drive means, means associated with said drive means for frictionally engaging said bars whereby said drive means is adapted to rotate said bars, a first station and means located at said first station for transferring codes to said bars, means at said first station for retaining said bars until they are coded and adapted to release said bars after they are coded, said retaining means holding said bars in opposition to the driving force of said driving means, a second station and means located at said second station for reading said codes, and second retaining means at said second station adapted to retain coded bars and to periodically release said coded bars one at a time.

6. An apparatus in accordance with claim 5 wherein said bars include a plurality of reciprocal pin members, and said code transferring means comprise electro-responsive means adapted to engage said pin members for reciprocating said members to move them to a protruding position, a plurality of contacts located at said second station, said reading means operating responsive to engagement of said contacts by said protruding means.

7. An apparatus according to claim 5 wherein said bars each include a centrally located leaf portion, a friction washer having one face in contact with each of said leaf portions, a plurality of drive washers operatively tied to said shaft with the other face of each of said friction washers engaging the face of one of said drive washers, and including means resiliently pressing said leaf portions and wash washers together.

8. An apparatus according to claim 5 including an annular track, and means at either end of said bars riding in said track, said retaining means being disposed adjacent said track and adapted to engage and disengage the said means riding in the track.

9. An apparatus for receiving a plurality of codes assigned to a corresponding number of articles comprising a plurality of elongated bars arranged in parallel, means for driving said bars about an enclosed path, a first station in said path and means located at said first station for transferring codes to said bars, means at said first station for retraining said movable bars until they are coded and adapted to release said movable bars after they are coded, said retaining means holding said bars in opposition to the driving force of said drive means, a second station in said path and means at said second station for reading said codes, and second retaining means at said second station adapted to retain coded movable bars and to release said coded bars one at a time.

10. An apparatus according to claim 9 wherein said bars include a plurality of magnetizable areas, and including means at said first station for magnetizing certain ones of said areas in accordance with the codes to be transferred, said reading means comprising a magnetically sensitive means located at said second station, and including means for erasing said codes located beyond said reading means.

11. An apparatus in accordance with claim 9 wherein said driving means include a drive shaft having an axis parallel to said bars, gear means keyed to said drive shaft, pinions associated with said bars and engaging said gear means, said pinions being mounted in shafts adapted to rotate relative to said bars, and said gear means being adapted to operate continuously whereby said bars are adapted to be moved along said path when not retained by said retaining means, and whereby said pinions are adapted to rotate relative to said bars in response to movement of said gear means when said bars are retained by said retaining means.

12. In an apparatus of the type described comprising an article accumulator adapted to receive articles at one end, and having a plurality of locations for retaining articles and adapted to discharge articles from its other end, the improvement in means for receiving a plurality of codes as they are assigned to articles placed on said accumulator comprising a plurality of relatively movable code receiving means, a first station and means located at said station for transferring said codes to said receiving means, means for moving the coded receiving means to a second station, means at said second station for holding said receiving means until the article corresponding to the code on said receiving means is discharged from the accumulator, means at said second station for reading said codes when said articles are discharged, and means for releasing said receiving means from said second station, said holding means being adapted to hold a plurality of said receiving means and operating to release said receiving means one at a time as each successive article corresponding to the separate codes is discharged.

13. In an apparatus of the type described comprising an article accumulator having an entry end, a plurality of locations for retaining articles, and having a discharge end, the improvement in means for receiving a plurality of codes as they are assigned to articles placed on said accumulator comprising a plurality of elongated bars rotatable about a central axis, a drive means, means associated with said drive means for frictionally engaging said bars whereby said drive means is adapted to rotate said bars, a first station and means located at said first station for transferring codes to said bars, means at said first station for retaining said movable bars until they are coded and adapted to release said movable bars after they are coded, said retaining means holding said bars in opposition to the driving force of said drive means, a second station, means at said second station for reading said codes, and second retaining means at said second station adapted to retain coded bars and to release said coded bars when said articles are discharged from said accumulator.

14. An apparatus in accordance with claim 13 wherein said bars include a plurality of reciprocal pin members, said code transferring means comprise electro-responsive means adapted to engage said pin members for reciprocating said members to move them to a protruding position, a plurality of contacts located at said second station, said reading means operating responsive to engagement of said contacts by said protruding means.

15. In an apparatus of the type described wherein an article accumulator having a plurality of locations for retaining articles is provided, and including means for periodically discharging articles from the accumulator, the improvement in means for receiving a plurality of said codes as they are assigned to articles placed on said accumulator comprising a plurality of elongated bars arranged in parallel, means for driving said bars about an enclosed path, a first station in said path and means located at said first station for transferring codes to said bars, means at said first station for retaining said movable bars until they are coded and adapted to release said movable bars after they are coded, said retaining means holding said bars in opposition to the driving force of said drive means, a second station, means located at said second station for reading said codes, and second retaining means at said second station adapted to retain coded bars and to release said coded bars when said articles are discharged.

16. An apparatus according to claim 15 wherein said driving means include a drive shaft having an axis parallel to said bars, gear means keyed to said drive shaft, pinions associated with said bars and engaging said gear means, said pinions being mounted in shafts adapted to rotate relative to said bars, and said gear means being adapted to operate continuously whereby said bars are adapted to be moved along said path when not retained by said retaining means, and whereby said pinions are adapted to rotate relative to said bars in response to movement of said gear means when said bars are retained by said retaining means.

17. In an apparatus of the type described wherein an article accumulator having a plurality of locations for retaining articles is provided, and including means for periodically transferring said articles to a conveyor system which is adapted to deposit said articles at a plurality of predetermined locations, said conveyor system being provided with memory means for initiating depositing of said articles in accordance with codes transferred to said memory means, the improvement in means for receiving said codes as they are assigned to articles placed on said accumulator, said code receiving means comprising a plurality of individual, relatively movable members, a first station and means located at said station for transferring codes to said receiving means, drive means normally operating to move said receiving means away from said first station, means at said first station for holding said receiving means in opposition to said drive means until a code is received by said receiving means, means for releasing said receiving means when a code is assigned thereto whereby said receiving means can be moved one at a time by said drive means to a second station, said drive means normally tending to move said code receiving means beyond said second station, means at said second station for holding said receiving means in opposition to the action of said drive means, additional means at said second station for reading said codes when said articles are passed to said conveyor, means for transferring said codes to said memory means and means for releasing said receiving means from said second station as said codes are transferred, said holding means being adapted to hold a plurality of said receiving means and operating to release said receiving means one at a time as articles corresponding thereto are passed to said conveyor system.

18. In an appartus for receiving a plurality of codes assigned to a corresponding number of articles and for generating a plurality of electrical signals corresponding to said codes, the improvement comprising a plurality of relatively movable code receiving means each carrying a plurality of members which are individually movable between inactive and activating positions, a first station and actuating means located at said station for transferring said codes to said receiving means, said actuating means transferring said codes by displacing selective ones of said members to activating position, means for moving the code receiving means to a second station, means at said second station for holding said receiving means and means at said second station for reading said codes comprising a plurality of elements positioned to be engaged by respective ones of said members depending upon which of said members is in activating position, an individual electrical circuit adapted to be completed for each position of said elements upon engagement by an activating member and means for releasing said receiving means from said second station, said holding means being adapted to hold a plurality of said receiving means until released by said releasing means one at a time.

References Cited by the Examiner

UNITED STATES PATENTS

| | | | |
|---|---|---|---|
| 2,307,712 | 1/1943 | Schenk | 214—11 |
| 2,601,154 | 6/1952 | Krueger. | |
| 2,636,622 | 4/1953 | Saxe | 214—11 |
| 2,807,376 | 9/1957 | Lens | 214—11 |
| 2,990,965 | 7/1961 | Smoll | 214—11 |
| 3,034,665 | 5/1962 | Speaker | 214—11 |

MARVIN A. CHAMPION, *Primary Examiner.*

MORRIS TEMIN, *Examiner.*